United States Patent [19]

Lymburner

[11] Patent Number: 4,664,364

[45] Date of Patent: May 12, 1987

[54] PROXIMITY SWITCH ASSEMBLY

[75] Inventor: Robert K. Lymburner, Mt. Clemens, Mich.

[73] Assignee: Ozz Industries, Inc., Mt. Clemens, Mich.

[21] Appl. No.: 897,495

[22] Filed: Aug. 15, 1986

[51] Int. Cl.[4] .............................................. B23Q 3/08

[52] U.S. Cl. ........................................ 269/32; 269/93; 269/233; 269/228; 269/329; 200/82 E

[58] Field of Search ..................... 269/31, 32, 93, 228, 269/233, 329; 74/106; 200/47, 153 LA, 82 E; 335/205

[56] References Cited

U.S. PATENT DOCUMENTS

| | | | |
|---|---|---|---|
| 3,347,542 | 10/1967 | Mericle | 269/228 |
| 3,565,416 | 2/1971 | Blatt | 269/32 |
| 3,724,837 | 4/1973 | McPherson | 269/32 |
| 3,727,500 | 4/1973 | Breetvelt | 269/32 |
| 4,086,456 | 4/1978 | Bone | 200/47 |
| 4,230,023 | 10/1980 | Ward | 200/82 E |
| 4,377,090 | 3/1983 | Seulen | 200/82 E |
| 4,396,183 | 8/1983 | Lymburner | 269/32 |

*Primary Examiner*—Robert C. Watson

*Attorney, Agent, or Firm*—Basile, Weintraub & Hanlon

[57] ABSTRACT

A proximity switch assembly for signalling the location of a movable member at either of opposite end limits of movement relative to a stationary frame includes a compact elongate housing adapted to be mounted on the frame to extend along the path of movement of a power driven member, such as a piston rod, which shifts the movable member between its end limits. A proximity switch is fixedly mounted in the housing and a switch actuating member is mounted for sliding movement over a relatively short distance sufficient to move an actuating tab into and out of actuating proximity to the switch. Lost motion abutment means on the switch actuating member and the power driven member move into engagement with each other as the power driven member approaches each end of its stroke to move the actuating member within actuating proximity to the switch as the movable member arrives at one end limit and to move the actuating member out of actuating proximity to the switch as the movable member arrives at its opposite end limit.

4 Claims, 4 Drawing Figures

PROXIMITY SWITCH ASSEMBLY

BACKGROUND OF THE INVENTION

The present invention is directed to a proximity switch assembly particularly adapted for use in signaling the location of a movable member at either of two end limits of movement. Although not so limited in application, the switch assembly of the present invention is especially adapted for use in power actuated clamps of the general type shown in my prior patent 4,396,183 in which a clamping arm is driven in movement between a closed workpiece clamping position and an open position by the piston rod of a fluid pressure actuated motor.

Such clamps are widely employed in automotive aassembly plants to clamp major sheet metal panels, such as roof panels, body side panels, and floor panels in a fixed position while the panels are being welded to each other. In the so called "framing station" disclosed in U.S. Pat. No. 4,162,387 a basic vehicle body assembly constituted by a floor panel, opposite side panels and a roof panel loosely assembled to each other is advanced into the framing station between a pair of clamp carrying "gates" which are then advanced to fixedly clamp the opposed side panels to locate the floor, side and roof panels in their final assembled position. While so clamped, robotic welding devices weld the panels to each other.

Systems such as that disclosed in U.S. Pat. No. 4,162,387 employ numerous power actuated clamps of the type referred to above, and in this completely automated system it is essential that all clamps be closed prior to the welding operation, and that this fact be verified by the control system before the robotic welders begin their welding cycle. Similarly, the control system must verify that all clamps are open before the retraction of the gates to accommodate the discharge of the welded body from the framing station.

While the detection of a clamp in its open or closed position could be accomplished by a conventional limit switch, the service life and reliability of exposed mechanically actuated limit switches in a robotic welding environment is unsatisfactory.

It has been proposed, see U.S. Pat. No. 4,316,145, to employ a commercially available magnetically biased reed switch, generally referred to as a proximity switch, mounted in the clamp actuating hydraulic cylinder to detect the arrival of the piston at either end of its stroke. The latter arrangement presents the advantage that the switch itself, due to its mounting in the cylinder, is shielded from dirt, weld splatter, etc., and the switch does not require any direct mechanical contact with a moving part in order to generate the desired signal. However, the arrangement disclosed in patent 4,316,145 requires the employment of two proximity switches, one to sense the arrival of the piston at each end of its stroke, the cylinder end cap must be modified to provide a mounting for the switch and normally a junction housing must be mounted on the exterior of the cylinder for each proximity switch. As noted above, in robotic welding systems, numerous clamp assemblies must be employed and mounted upon the gate at locations determined by the configuration of the body panel, rather than convenience, and substantial operating clearances must be provided for movement of several robotic welding heads which must pass through the gate to reach the seams which they are to weld.

The present invention is directed to a proximity switch assembly useful in the environment described above which is of extremely compact construction, requires a minimum of structural modification of a conventional power actuated clamp, and which requires only a single proximity switch whose contacts are located in one position when the clamp is clamped and remain in that one position until the clamp is completely open, at which time the contacts are shifted to their other position until the clamp is again at its clamped position.

SUMMARY OF THE INVENTION

In a typical power actuated clamp, the clamp assembly includes a housing adapted to be mounted on a fixed frame and a hydraulic motor fixedly mounted upon the housing with its piston rod disposed to be reciprocated within the housing. A clamping arm pivotally mounted on the housing and coupled to the piston rod by a link in a manner such that straight line movement of the piston rod drives the clamping arm in pivotal movement between the clamp open and clamped closed position.

In accordance with the present invention, a proximity switch for detecting the arrival of the clamp at its closed or its open position is mounted in a relatively close fitting housing which is in turn mounted on the clamp housing to extend along and cover an elongate slot through the clamp housing wall which extends in adjacent parallel relationship to the path of movement of the piston rod of the clamp actuating motor. An elongate proximity switch actuator is slidably mounted within the switch housing for limited sliding movement parallel to the piston path. The switch actuator includes a projecting actuator tab mounted on the actuator in adjacent spaced relationship to the proximity sensing element of the switch to be moved into and out of actuating range of the sensing element by the sliding movement of the actuator relative to the fixed housing.

A pair of facing abutment shoulders are mounted on the actuator member near its opposite ends and are spaced from each other by a distance slightly less than the stroke of the piston rod between the clamp closed and clamp open position. A pin or abutment is mounted on the piston rod or some element movable with the piston rod to project through the slot in the clamp housing into the space between the opposed abutment shoulders on the proximity switch actuator member. As the piston rod moves to one end limit of movement, representing for example the clamp open position, the pin or abutment carried with the piston rod will engage one of the shoulders on the proximity switch actuator and slide this actuator relative to the switch to move its tab into actuating range of the sensing element of the switch to close the switch contacts.

Upon subsequent movement of the piston rod toward the clamp open position, the pin or abutment will be disengaged from the aforementioned shoulder, leaving the switch in its "on" condition, and as the piston rod arrives at its clamp open position, the piston rod carried abutment will engage the opposite abutment shoulder on the actuating member to slide that member in a direction moving the actuating tab out of actuating proximity with the switch to open the switch contacts. The characteristics of the switch are such that this shifting movement of the actuating tab need only be about 1/10th of an inch between its switch "on" and switch "off" positions, hence shifting of the switch from one condition to the other is essentially simultaneous with the arrival of the clamp at its clamp closed or its clamp open position.

Other objects and features of the invention will become apparent by reference to the following specification and to the drawings.

IN THE DRAWINGS

DESCRIPTION OF THE PREFERRED EMBODIMENT

Figure 1:
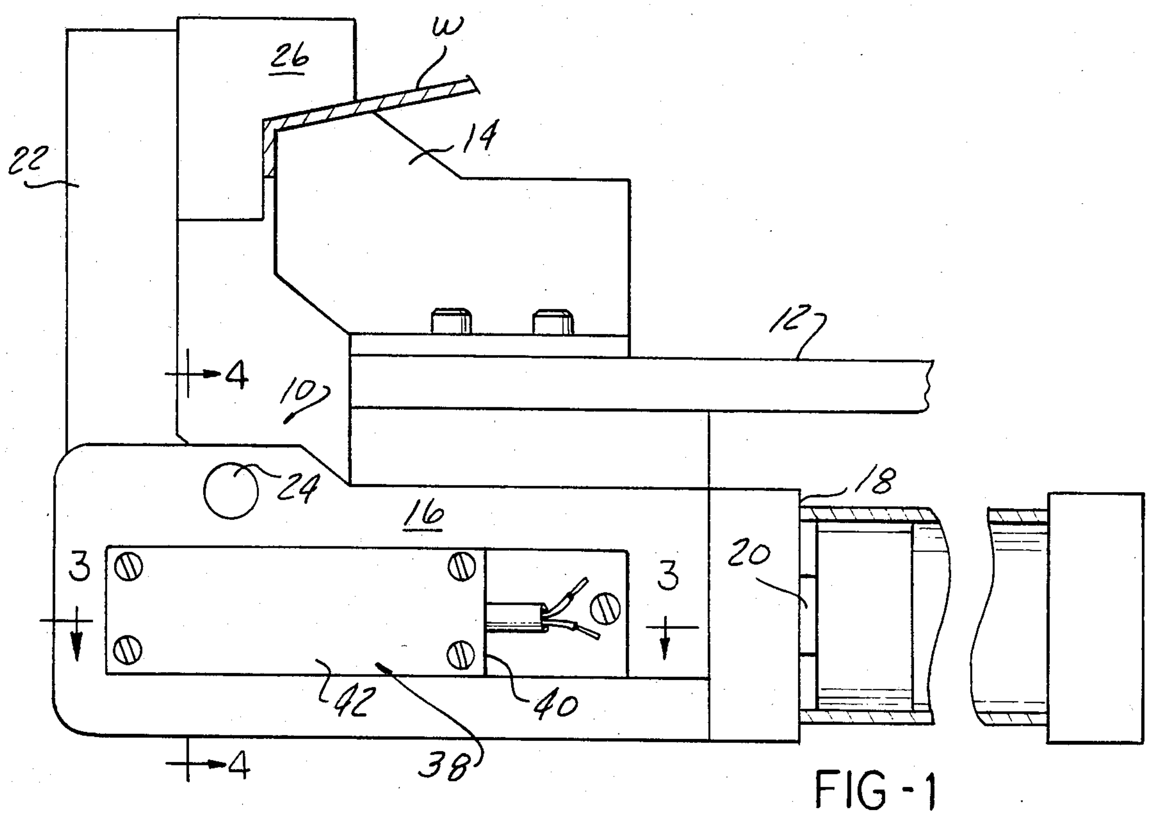
FIG. 1 is a side elevational view showing a proximity switch assembly embodying the present invention mounted upon a typical power actuated clamp, with certain parts broken away or shown in section.

Referring first to FIG. 1, a power actuated clamp designated generally 10 is fixedly mounted upon a frame 12 which in turn fixedly mounts a stationary workpiece engaging jaw 14 conformed to the shape of a workpiece W. The clamp assembly 10 includes a housing 16 upon which is mounted the cylinder of a hydraulic motor 18 whose piston rod 20 projects into the housing. A clamping arm 22 is mounted in housing 16 for pivotal movement about a pivot 24. Arm 22 carries a jaw 26 conformed to fixedly clamp workpiece W against stationary jaw 14 when the clamping arm is positioned as shown in FIG. 1 by piston rod 20.

Figure 2:
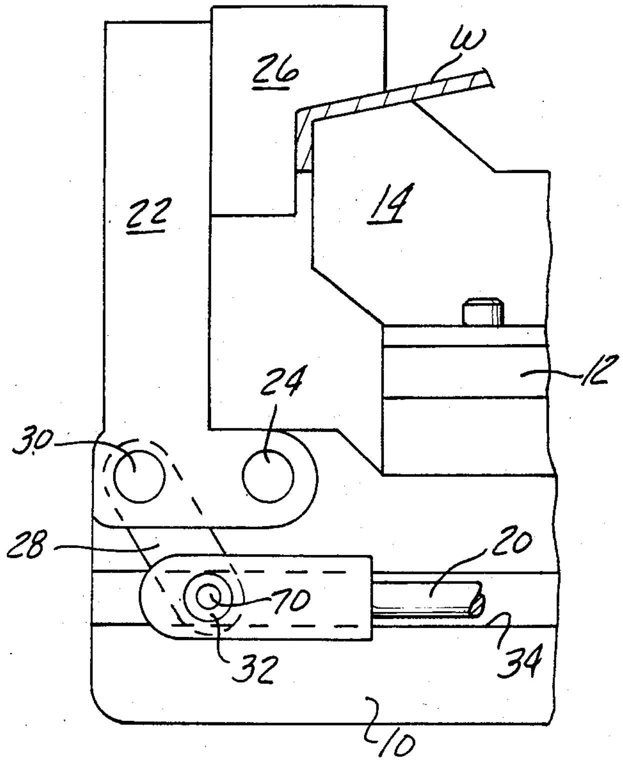
FIG. 2 is a partial side elevational view of the clamp of FIG. 1 with the proximity switch assembly and one side plate of the clamp housing removed.

Referring now to FIG. 2, in which the housing side plate closest to the observer in FIG. 1 has been removed, it is seen that piston rod 20 is coupled to clamp arm 22 by a link 28 connected at one end by pivot 30 to clamp arm 22 and connected at its opposite end to piston rod 20 by a pivot 32. Referring now particularly to FIG. 2, it is seen that pivot 32 projects outwardly beyond the opposite sides of piston rod 20 and that the projecting ends of pivot 32 are received within elongate slots 34, 36 formed in the opposed housing side walls. This arrangement guides and supports the distal end of piston rod 20 in straight line movement throughout its entire stroke.

Referring now to FIG. 1, a proximity switch assembly designated generally 38 is fixedly mounted at the outer side of that side wall of housing 16 through which the slot 36 passes to completely overlie slot 36.

Switch assembly 38 includes a housing 40 having a removable cover 42 which provides access to an elongate chamber 44 within the housing. The bottom of chamber 44 is defined by a wall 46 from which a pair of mounting flanges 48 project to engage the walls of slot 36 in the side wall of clamp housing 16. A square nut 50 slidably received and retained in grooves 53 in the side walls and bottom of chamber 44 threadably receives a proximity switch 52 to support switch 52 within chamber 44 and do accommodate longitudinal adjustment of switch 52 relative to housing 40.

Proximity switch 52 takes the form of a commercially available magnetically biased reed switch which includes a sensor 54 located on one end of the switch which is operable to close a set of normally open contacts within the switch when a metal object is moved within a predetermined distance of the sensor. This type of switch is referred to as a proximity switch because it is not necessary that the metallic object actually contact the sensor in order to trigger the switch. The sensitivity of the sensor is such that movement of the metallic object over a distance of approximately 1/10th an and inch toward or away from the sensor will shift the switch to an on or an off position.

Figure 3:
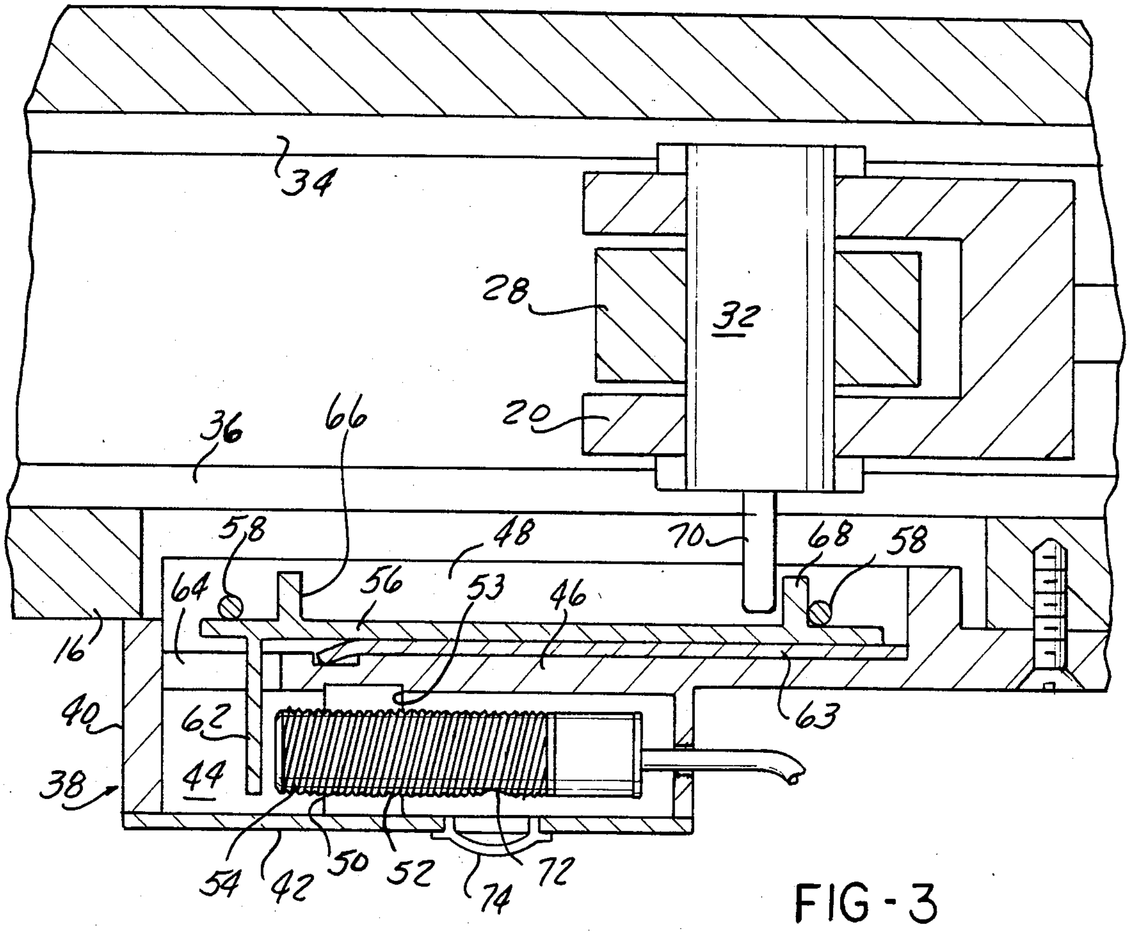
FIG. 3 is a detailed cross-sectional view taken on line 3—3 of FIG. 1.
Figure 4:
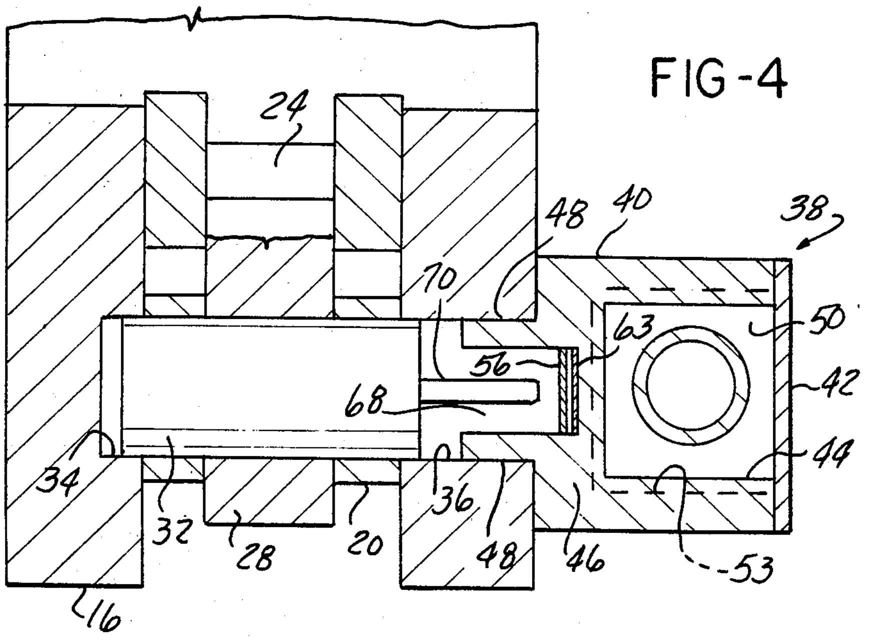
FIG. 4 is a detailed cross-sectional view taken on line 4—4 of FIG. 1.

An elongate switch actuator 56 is mounted between mounting flanges 48 of the switch housing for sliding movement longitudinally of the housing. A pair of pins 58 mounted in, and extending between, the flanges 48 retain actuator member 56 within the housing and a leaf spring 63 engaged between member 56 and wall 46 of the housing resiliently biases actuator member 56 firmly against pins 58 to provide a substantial amount of frictional resistance to sliding movement of actuator 56 relative to housing 40. As best seen in FIG. 3, an actuator tab 62 fixedly secured to or formed on actuator member 56 projects from one side of member 56 through a slot 64 in wall 46 into alignment with sensor 54 of switch 52. A pair of projections, defining spaced opposed abutment shoulders 66, 68 are fixedly secured to and project from the opposite side of member 56 toward the path of movement of piston rod 20. A pin 70 is fixedly secured to and projects from pivot 32 outwardly from the pivot into the space between abutment shoulders 66, 68 on actuator member 56.

In FIG. 3, piston rod 20 is shown at its fully retracted end limit of movement which corresponds to the unclamped condition of clamp assembly 10. With the piston rod 20 at its unclamped end limit of movement, pin 70 on pivot 32 is engaged with abutment shoulder 68 and has positioned the abutment shoulder 68 substantially in engagement with the right hand pin 58, which may also function as a stop defining an end limit of movement of actuator member 56 to the right relative to housing 40 as viewed in FIG. 3.

With actuating member 56 in the position shown in FIG. 3, its actuating tab 62 is within actuating proximity of sensor 54 of the proximity switch, and the switch is in its actuated or switch on position. The switch 52 shown in the drawings is provided with a light 72 which will be illuminated when the switch is on, and a suitable lens 74 in housing cover 42 will make this light visible, thus providing a visible confirmation of the location of the clamp assembly in its fully open position. The electrical contacts of switch 52 will be connected into a control circuit to supply this information to the control circuit.

When piston rod 20 is driven from the FIG. 3 position to the left as viewed in FIG. 3 to shift the clamp assembly to its clamped position, pin 70 will be disengaged from abutment shoulder 68 as soon as this movement starts. However, actuator member 56 will remain in the FIG. 3 position and proximity switch 52 will thus remain closed. As piston rod 20 approaches its fully extended clamping position, pin 70 will move into engagement with abutment shoulder 66 of actuator member 56 and shift the actuator member 56 to the left as viewed in FIG. 3 to move actuating tab 62 away from the proximity switch sensor 54. The spacing between abutment shoulders 66 and 68 is selected to be such that pin 70 will not engage shoulder 66 until piston rod 20 is within a relatively short distance, say ⅛th of an inch, of its fully extended clamping position. During this final stage of movement to fully extended end limit, pin 70 on piston rod 20 will engage abutment shoulder 66 and drive actuator member 56 to the left a sufficient distance to move actuating tab 62 out of actuating range of sensor 54. As soon as actuating member 62 moves out of range of sensor 54, the proximity switch shifts to its switch off position, indicator light 72 will go out, and the control circuit will be signaled by the switch that the clamp is in its clamped position.

Upon subsequent return of piston rod 20 to its unclamped end limit of movement, a similar action occurs, that is, switch 52 remains in its off position until, near the end of its stroke, pin 70 on piston rod 20 engages abutment shoulder 68 and returns actuating member 56 to its switch on position as the clamp arrives at its fully unclamped position.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

I claim:

1. In combination with a power actuated device including a rigid member mounted within a fixed frame for movement along a fixed path relative to said frame between a first end limit of movement and a second end limit of movement, power actuated means for driving said rigid member in either direction from one of said end limits to the other, and proximity switch means for signalling the arrival of said member at either of said end limits; the improvement wherein said proximity switch means comprises means defining a slot extending through said frame along said fixed path, a housing fixedly mounted upon said frame in surrounding relationship to said slot, a proximity switch fixedly mounted in said housing, a proximity switch actuator member mounted in aid housing for sliding movement parallel to said path between a first position wherein said actuator member is within actuating proximity to said switch and a second position wherein said actuator meember is out of actuating proximity to said switch, first abutment means on said rigid member, second abutment means on said actuator member, one of said abutment means comprising means on one of said members defining an elongate recess terminating at opposite ends in abutment shoulders normal to said fixed path and the other of said abutment means comprising a projection on the other of said members projecting from said other of said members normal to said fixed path through said slot in said frame into the recess of said one of said members between said abutment shoulders, said shoulders being spaced from each other by a distance such that upon movement of said rigid member to said first end limit one of said shoulders engages said projection and pushes said actuator member into said first position, and upon movement of said rigid member to said second end limit the other of said shoulders engages said projection and pushes said actuator member into said second position.

2. In a power actuated clamp including a fixed frame, a fluid pressure actuated motor mounted on said fixed frame and including a piston rod reciprocable along a fixed path relative to said frame between a first and a second end limit of movement, clamp arm means coupled to said piston rod to be located in a clamp closed position when said piston rod is at one of said end limits and to be located in a clamp opened position when said piston rod is at the other of said end limits, and signalling means for signalling the arrival of said clamp arm means at said clamp closed and clamp open positions; the improvement wherein said signalling means comprises a housing adapted to be fixedly mounted on said frame, a proximity switch meeans mounted within said housing and including on-off switch means and actuating means operable to switch said switch means to its on state upon location of said actuating means within a first distance from said switch means and operable to switch said switch means to its off state when said actuating means is located beyond said first distance from said switch means, an actuating member mounted in said housing for movement relative to said housing along a path parallel to said path of movement of said piston rod between a first position and a second position, first abutment means mounted on said piston rod for reciprocatory movement therewith, and second abutment means on said actuating member engageable with said first abutment means as said piston rod approaches one of its end limits to shift said actuating member from one of said first and said second positions to the other as said piston rod arrives at said one end limit and to move said actuating member from said other position to said one position as said piston rod arrives at its other end limit.

3. The invention defined in claim 2 wherein said second abutment means comprises means on said actuating member defining a pair of facing opposed abutment shoulders spaced from each other by a distance substantially equal to but slightly less than the length of the stroke of said piston rod between its first and second end limits, and said first abutment means comprises a pin projecting perpendicularly from one side of said piston rod into the space between said shoulders.

4. The invention defined in claim 2 wherein said actuating member comprises an elongate body mounted for longitudinal sliding movement in said housing, an actuating tab fixedly mounted on and projecting from one side of said body in opposed spaced relationship to said switch means to constitute said actuating means, and means engaged between said body and said housing for frictionally resisting movement of said body relative to said housing.

* * * * *